(12) United States Patent
Ruuska

(10) Patent No.: US 8,897,788 B2
(45) Date of Patent: Nov. 25, 2014

(54) TECHNIQUES TO PROVIDE MEASUREMENT PILOT TRANSMISSION INFORMATION IN WIRELESS NETWORKS

(75) Inventor: Paivi M. Ruuska, Tampere (FI)

(73) Assignee: Nokia Corporation, Espoo (FI)

( * ) Notice: Subject to any disclaimer, the term of this patent is extended or adjusted under 35 U.S.C. 154(b) by 145 days.

(21) Appl. No.: 11/521,063

(22) Filed: Sep. 14, 2006

(65) Prior Publication Data

US 2007/0064655 A1     Mar. 22, 2007

Related U.S. Application Data

(60) Provisional application No. 60/718,002, filed on Sep. 16, 2005, provisional application No. 60/800,242, filed on May 12, 2006.

(51) Int. Cl.
| | | |
|---|---|---|
| *H04W 36/00* | (2009.01) | |
| *H04W 28/18* | (2009.01) | |
| *H04W 48/16* | (2009.01) | |
| H04B 17/00 | (2006.01) | |
| H04W 4/00 | (2009.01) | |
| H04B 7/00 | (2006.01) | |
| H04W 24/00 | (2009.01) | |
| H04W 8/00 | (2009.01) | |

(52) U.S. Cl.
CPC ............ *H04W 48/16* (2013.01); *H04W 24/00* (2013.01); *H04W 28/18* (2013.01); *H04W 8/005* (2013.01)
USPC ........ 455/437; 455/67.13; 455/438; 455/436; 370/332; 370/310; 370/328

(58) Field of Classification Search
USPC ................ 455/437, 67.13; 370/332; 53/437
See application file for complete search history.

(56) References Cited

U.S. PATENT DOCUMENTS

| 7,385,945 B1 * | 6/2008 | Olson et al. ................. 370/328 |
| 2001/0016493 A1 * | 8/2001 | Kim et al. .................... 455/436 |

(Continued)

FOREIGN PATENT DOCUMENTS

| EP | 1473956 A2 | 11/2004 |
| WO | WO 2004104737 * | 5/2004 |

(Continued)

OTHER PUBLICATIONS

"Normative Text Enabling Neighbor Report For Multiple ESSs", IEEE P802. 11 Wireless LANs; doc. : IEEE, (Jul. 14, 2005).

(Continued)

*Primary Examiner* — Timothy Pham
(74) *Attorney, Agent, or Firm* — Alston & Bird LLP

(57) ABSTRACT

Various embodiments are disclosed relating to techniques to provide neighbor information in wireless networks and/or techniques to provide measurement pilot transmission information in wireless networks. According to an example embodiment, a neighbor report may be received from a first wireless node, the neighbor report including at least measurement pilot transmission information for one or more other wireless nodes. According to an example embodiment, a signal measurement technique for measuring signals from at least one of the one or more other wireless nodes may be determined based, at least in part, upon the neighbor report. According to another example embodiment, a message may be received from a first wireless node, the message including measurement pilot transmission information for the first wireless node. A signal measurement technique for measuring signals from the first wireless node may be determined based, at least in part, upon the received message.

17 Claims, 17 Drawing Sheets

(56) References Cited

U.S. PATENT DOCUMENTS

| | | | |
|---|---|---|---|
| 2004/0176094 A1* | 9/2004 | Kim et al. | 455/438 |
| 2004/0185853 A1* | 9/2004 | Kim et al. | 455/438 |
| 2004/0219926 A1* | 11/2004 | Kim et al. | 455/452.2 |
| 2005/0128988 A1* | 6/2005 | Simpson et al. | 370/338 |
| 2005/0136929 A1* | 6/2005 | Iacono et al. | 455/436 |
| 2006/0052106 A1* | 3/2006 | Park | 455/436 |
| 2006/0268756 A1* | 11/2006 | Wang et al. | 370/310 |

FOREIGN PATENT DOCUMENTS

| | | | |
|---|---|---|---|
| WO | WO 2004/104737 | * | 12/2004 |
| WO | 2007031855 A2 | | 3/2007 |
| WO | 2007031855 A3 | | 3/2007 |

OTHER PUBLICATIONS

"Measurment pilot Frame", IEEE P802. 11 Wireless LANs, (Mar. 2005).

"Measurement Pilot Transmission Information as optional information in Probe Response and Neighbor Report", IEEE P802. 11 Wireless LANs, (May 2006).

International Search Report and Written Opinion for corresponding application # PCT/IB2006/002544, (Mar. 29, 2007),14 Pgs.

IEEE, "Draft Amendment to Standard for Information Technology—Telecommunications and Information Exchange Between Systems—LAN/MAN Specific Requirements", Part 11: Wireless Medium Access Control (MAC) and physical layer (PHY) specifications, Amendment 9: Radio Resource Measurement, (Jul. 2005).

Office Action for Chinese Application No. 200680032107.8 (with English Translation), mailed Jul. 4, 2011, 25 pages.

European Extented Search Report for European Patent Application No. 06795494.1, mailed on Mar. 14, 2012, 6 pages.

Aboba, Bernard, et al., Neighbor Report, XP-002670599, IEEE 802. 11-04-0766-00-000k, Jan. 2004, 6 pages.

Matta, Sudheer, et al., "Proposed Test for Neighbor Report Enhancements", IEEE P802.11, Wireless LANs, Submission, XP-002670665, Jul. 9, 2004, pp. 1-16.

Office Action from Chinese Patent Application No. 200680032107.8, mailed Sep. 4, 2012.

Office Action for Chinese Patent Application 200680032107.8 dated Dec. 5, 2012.

Office Action from Chinese Patent Application No. 200680032107.8, mailed May 4, 2012.

Office Action for Chinese Patent Application 200680032107.8 dated Mar. 5, 2013.

Office Action for EuropeanPatent Application 06795494.1 dated Jan. 28, 2013.

* cited by examiner

| Order | Information | Notes |
|---|---|---|
| 1 | Timestamp | |
| 2 | Measurement Pilot Interval | |
| 3 | Beacon Interval | |
| 4 | Capability Information | |
| 5 | RSN Capabilities | |
| 6 | Country String | |
| 7 | Max Regulatory Power | |
| 8 | Max Transmit Power | |
| 9 | Transmit Power Used | |
| 10 | Transceiver Noise Floor | |
| 11 | DS Parameter Set | The DS Parameter Set information element is present within Measurement Pilot frames generated by STAs using direct sequence PHYs. |

200

Measurement Pilot frame body

FIG. 2

| Category | Action | Dialog Token | Neighbor Report Request Types | SSID |
|---|---|---|---|---|
| 1 | 1 | 1 | 1 | variable |

Octets

300

Neighbor report request frame body format

FIG. 3

| Category | Action | Dialog Token | Neighbor Report Elements |
|---|---|---|---|
| 1 | 1 | 1 | variable |

400

Octets:

Neighbor Report Response frame body format

FIG. 4 receiving a neighbor report from a first wireless node, the neighbor report including at least measurement pilot transmission information for one or more other wireless nodes;

*1612* wherein the measurement pilot transmission information includes a measurement pilot interval for the one or more other wireless nodes

1610

1600

FIG. 16 ial Application Ser. No. 60/718,002, filed on Sep. 16, 2005, entitled "Technique to Provide Neighbor Information in Wireless Networks" and to U.S. Provisional Application Ser. No. 60/800,242, filed on May 12, 2006, entitled "Techniques to Provide Measurement Pilot Transmission Information in Wireless Networks," both of which are hereby incorporated by reference.

TECHNIQUES TO PROVIDE MEASUREMENT PILOT TRANSMISSION INFORMATION IN WIRELESS NETWORKS

CROSS-REFERENCE TO RELATED APPLICATIONS

This application claims priority to U.S. Provisional Application Ser. No. 60/718,002, filed on Sep. 16, 2005, entitled "Technique to Provide Neighbor Information in Wireless Networks" and to U.S. Provisional Application Ser. No. 60/800,242, filed on May 12, 2006, entitled "Techniques to Provide Measurement Pilot Transmission Information in Wireless Networks," both of which are hereby incorporated by reference.

BACKGROUND

Wireless networks, such as wireless local area networks (WLAN) typically communicate via radio or other frequencies. In a WLAN, for example, mobile stations are typically moving around, and may communicate with an access point (AP) or base station. The AP is typically a fixed device that may (or may not) be connected to infrastructure networks or wired networks.

The most common WLAN technology is described in the Institute of Electrical and Electronics Engineers IEEE 802.11 family of industry specifications, such as specifications for IEEE 802.11b, IEEE 802.11g and IEEE 802.11a. A group of 802.11 mobile stations may be in communication with each other (either directly or through one AP) in a network known as a basic service set (BSS), which may be identified by a basic service set identifier (BSSID). A group of BSSs (e.g., with one AP per BSS) may be coupled together in a larger WLAN network (e.g., with multiple APs) known as an extended service set (ESS), which may be identified by a service set ID (SSID).

When a mobile station moves around a wireless network (e.g., WLAN), the station may need to change its present association from one AP to another AP if the signal reception level, of the presently associated (serving) AP becomes too low and/or another AP provides a better signal level or capabilities. This procedure is known as roaming, and allows a mobile station to switch association among APs.

Before roaming or associating with a new AP, a mobile station may first locate one or more APs. There are a number of known techniques for measuring or monitoring radio signals to allow roaming between APs. Signals transmitted by APs may generally be monitored, and the received signal strength (RSS) may be measured for each AP, for example. In particular, APs may be located, for example, via passive scanning and by active scanning.

In passive scanning, a wireless station may monitor one or more channels to determine if there is a beacon or probe response transmitted by APs. A beacon may be transmitted by each AP at regular intervals (known as beacon intervals), e.g., every 100 ms. A beacon (or beacon signal) may include, for example, an AP timestamp, a BSSID identifying a specific WLAN network, a traffic indication map (TIM), beacon interval (or amount of time between beacon transmissions), an indication of the supported data rates, parameter sets or information about specific signaling methods that are supported, capability information (such as whether Wired Equivalency Privacy or WEP protocol is supported), and other information. In passive scanning, a node may listen for beacons or probe responses on each of a plurality of channels, gathering information on each AP such as received signal strength, capabilities and data rates of the AP, etc. In some instances, passive scanning may expend time and power while a node is listening for a beacon or probe response that may never occur or while the node may be listening to an idle channel.

Active scanning may involve a mobile station transmitting a probe request to one or more specific APs, and receiving probe responses from the APs. Active scanning allows mobile stations to interact with APs or other stations to obtain information. A mobile station may transmit, for example, a probe request that specifies a service set identity (SSID) in the probe request frame. Any AP or station on the channel that matches the SSID may, for example, respond with a probe response. The probe response, similar to a beacon, may provide information that may be useful to allow a station to access the network or associate with an AP. When compared to monitoring of beacons (passive scanning), active scanning may, in some cases, result in longer battery life (e.g., may consume less battery power), but also may reduce network capacity due to the probe request/probe response traffic.

In some WLAN networks, it has been proposed for APs to provide a neighbor report to a wireless station, in some cases. A neighbor report may be transmitted, for example, from an AP to a wireless station to provide the station with information regarding other (e.g., neighbor) access points (APs). These proposed neighbor reports may include information relating to for example the frequency band and channel where the reported APs are located, PHY type of the reported APs, synchronization information and information of the beacons, such as beacon intervals.

It has also been recently proposed for APs to transmit measurement pilots (which sometimes may be referred to as gratuitous probe responses). An AP may typically transmit a measurement pilot frame much more frequently (e.g., every 10 ms) than a beacon (e.g., every 100 ms) to provide more frequent information to stations. Thus, because the measurement pilot frame interval is typically much shorter than a beacon interval, stations may use measurement pilot frames to detect whether there is an AP transmitting on the channel, to measure the channel quality (e.g., measure received signal strength), and to receive other information relating to the AP in a much shorter period of time, e.g., as compared to waiting for the next beacon on the channel. Thus, at least in some cases, measurement pilot frames may facilitate quicker roaming decisions and association to a new AP. The measurement pilot frame may contain much of the same information provided in a beacon or probe response, but the measurement pilot is shorter since it may not include some of the longer fields in the beacon (such as TIM and DTIM fields).

SUMMARY

Various embodiments are disclosed relating to techniques to provide neighbor information in wireless networks and/or to provide measurement pilot transmission information in wireless networks.

In an example embodiment, a neighbor report may be received from a first wireless node (e.g., a serving access point or AP). The neighbor report may be obtained by a station from an AP, for example, in an association response, a probe response, or in response to a separate neighbor report request. According to an example embodiment, the neighbor report may include at least measurement pilot transmission information for one or more other wireless nodes (or APs). A signal measurement technique may be determined for measuring signals from at least one of the one or more other wireless nodes based, at least in part, upon the neighbor report. According to an example embodiment, the neighbor report may comprise measurement pilot transmission information and beacon information for the one or more other wireless nodes (e.g., neighbor APs). In another embodiment, the measurement pilot transmission information may include an indication of whether or not one of the other (neighbor) nodes or APs is transmitting a measurement pilot. The neighbor report may include, for example, a measurement pilot interval, a network ID and a timer value or timer offset for the one or more other wireless nodes or APs. In another example embodiment, the signal measurement technique that may be determined may include: monitoring or receiving measurement pilot signals; passive scanning using received beacons; or active scanning using probe requests and probe responses.

According to an example embodiment, a neighbor report request may be transmitted to a first access point (AP). According to an example embodiment, the transmitting a neighbor report request may include transmitting a neighbor report request to a first access point (AP), the neighbor report request specifying one or more of beacon information and/or measurement pilot transmission information to be provided in the neighbor report for one or more other APs. A neighbor report may be received from the first AP. According to an example embodiment, the neighbor report may be received from the first AP, the neighbor report comprising a measurement pilot interval for at least one of the one or more other APs. A signal measurement technique may be determined for measuring signals from one or more other wireless nodes based, at least in part, upon the neighbor report. According to an example embodiment, signals may be measured from at least one of the one or more other wireless nodes using the determined measurement technique.

According to another example embodiment, a neighbor report may be received from a first AP, the neighbor report including at least a measurement pilot interval for one or more other APs. A measurement period or time to receive or measure a measurement pilot for the one or more other APs may be determined based on the neighbor report. A measurement pilot of one or more other APs may be measured or received based on the determining. Either active scanning or passive scanning may be used to, obtain further information regarding at least one of the one or more other APs. One of the other APs may be associated with based on the further information.

In another example embodiment, an apparatus may be provided that includes a controller, a memory coupled to the controller, and a wireless transceiver coupled to the controller. The apparatus may be adapted to: receive a neighbor report from a first wireless node, the neighbor report including at least measurement pilot transmission information for one or more other wireless nodes; and to determine a signal measurement technique for measuring signals from the one or more other wireless nodes based, at least in part, upon the neighbor report. In an example embodiment, the apparatus may be adapted to receive the neighbor report from the first wireless node, the neighbor report including one or more of: 1) an indication of whether or not a node is transmitting a measurement pilot, or 2) a measurement pilot interval, for at least one of the one or more other wireless nodes.

In another example embodiment, a message may be received from a first wireless node, the message including measurement pilot transmission information for the first wireless node. A signal measurement technique for measuring signals from the first wireless node may be determined based, at least in part, upon the received message. According to an example embodiment, the received message may include either a probe response message or a neighbor report. According to an example embodiment, the measurement pilot transmission information may include an indication of whether or not the first wireless node is transmitting a measurement pilot. According to an example embodiment, the measurement pilot transmission information may include a measurement pilot interval for the first wireless node. According to an example embodiment, the determining comprises determining one or more of the following signal measurement techniques to be used for measuring signals from the first wireless node, based at least in part, upon the measurement pilot transmission information for the first wireless node: monitoring or receiving measurement pilot signals from the first wireless node; or active scanning using probe requests and probe responses.

In another example embodiment, a message may be received from a first wireless node, the message including measurement pilot transmission information for the first wireless node. A time to receive measurement pilot signals from the first wireless node may be estimated based, at least in part, upon the measurement pilot transmission information in the received message. According to an example embodiment, measurement pilot signals may be received from the first wireless node at the estimated time. According to an example embodiment, the received message may include either a probe response message or a neighbor report. According to an example embodiment, the measurement pilot transmission information may include an indication of whether or not the first wireless node is transmitting a measurement pilot. According to an example embodiment, the measurement pilot transmission information may include a measurement pilot interval for the first wireless node.

According to another example embodiment, a neighbor report may be received from a first wireless node, the neighbor report including at least measurement pilot transmission information for one or more other wireless nodes. According to an example embodiment, the measurement pilot transmission information may include a measurement pilot interval for the one or more other wireless nodes.

In another example embodiment, an apparatus may be provided that includes a controller, a memory coupled to the controller, and a wireless transceiver coupled to the controller. The apparatus may be adapted to receive a neighbor report from a first wireless node, the neighbor report including at least measurement pilot transmission information for one or more other wireless nodes.

BRIEF DESCRIPTION OF THE DRAWINGS

FIG. 2 is a diagram illustrating a frame body for a measurement pilot frame according to an example embodiment.

FIG. 3 is a diagram illustrating a neighbor report request frame body format according to an example embodiment.

FIG. 4 is a diagram illustrating a neighbor report response frame body format according to an example embodiment.

FIG. 16 is a flow chart illustrating operation of a wireless node according to another example embodiment.

DETAILED DESCRIPTION

Figure 1:
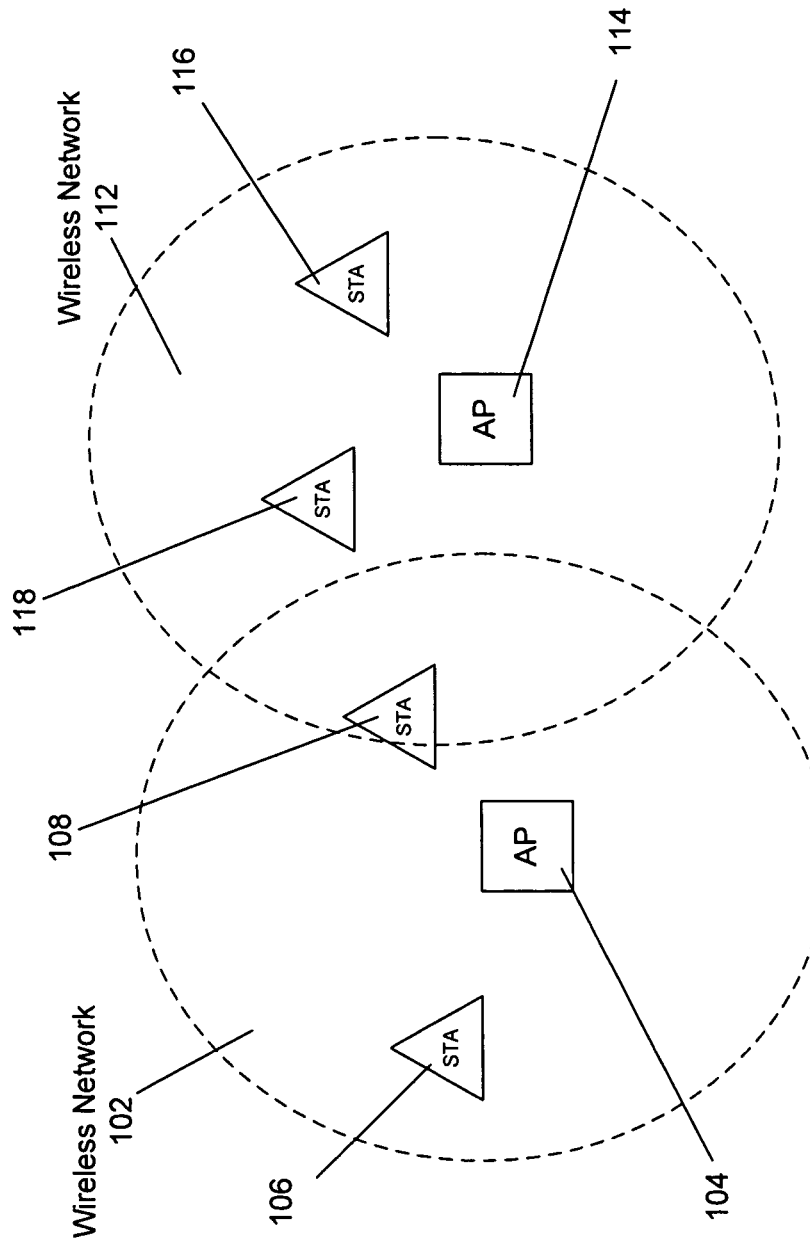
FIG. 1 is a diagram illustrating wireless networks according to an example embodiment.

Referring to the Figures in which like numerals indicate like elements, FIG. 1 is a diagram illustrating wireless networks 102 and 112 according to an example embodiment. According to an example embodiment, a wireless network, such as wireless network 102 and wireless network 112 may each include a number of wireless nodes, such as mobile stations, Access Points (APs), base stations, etc.

According to an example embodiment, each wireless network 102, 112 may include an Access Point (AP) and one or more mobile stations that may be in communication with the AP. For example, as shown in FIG. 1, wireless network 102 may include an AP 104 and several mobile stations that may be in communication with AP 104, such as mobile station 106 and mobile station 108. Similarly, wireless network 112 may include AP 114 and several mobile stations that may be in communication with AP 114, such as mobile station 116 and mobile station 118. Although not shown, AP 102 and AP 112 may be coupled to a fixed network.

The various embodiments described herein may be applicable to a wide variety of networks and technologies, such as WLAN networks (e.g., IEEE 802.11 type networks), cellular networks, radio networks, or other wireless networks. In another example embodiment, the various examples and embodiments may be applied to a meshed wireless network, where a plurality of mesh points (e.g., Access Points) may be coupled together via wired or wireless links. The term "node" or "wireless node" or "network node" or "network station" may refer, for example, to a wireless station, e.g., a subscriber station or mobile station, an access point or base station, a relay station or other intermediate wireless node, or other wireless computing devices, such as laptop computers, desktop computers, and peripheral devices, as examples.

FIG. 2 is a diagram illustrating an example frame body 200 for a measurement pilot frame according to an example embodiment. For example, the measurement pilot body 200 may include: a timestamp—representing a value of a timing synchronization function (TSF) of a pilot's source; measurement pilot interval—the transmission interval of measurement pilots; beacon interval—the beacon interval of the transmitting wireless node (e.g., AP); capability information—describes some capabilities of the transmitting node; Robust security network (RSN) capabilities—which may contain security related information (e.g., for authentication and ciphering); country string—providing country information; and a number of other fields, including max regulatory power, max transmit power, transmit power used, transceiver noise floor and DS (direct sequence) parameter set (e.g., a field which may be used if a direct sequence physical layer device (PHY) is used). Also, in mesh networks the packets similar to beacon or measurement pilot may be transmitted regularly. Those packets may include information of the transmitting mesh point or the mesh network.

A variety of different services or functions may be provided in a wireless (e.g., WLAN) network. These services may include, for example, authentication (e.g., the process by which a mobile station may be authenticated by an AP), association (e.g., the process by which a mobile station may register with an AP), and other services.

One service that may be performed by a network may include radio measurement (or radio resource measurement), which may include, for example: performing radio measurements, requesting and reporting of radio measurements, providing information about neighbor APs, and other functions related to radio measurements. For example, as part of radio measurement, a station may transmit different radio measurement requests to other stations for radio measurement information, e.g., radio measurement information for other (neighbor) APs. A node (e.g., station or AP) receiving a radio measurement request from another node (e.g., AP or other station) may generate and transmit an appropriate radio measurement report to the requesting wireless node to provide the requested information.

These radio measurement requests may include, for example, a beacon request (or beacon measurement request), which may be submitted by an AP to a station, for example. In response to the beacon request, the station may provide the AP a beacon report, which may provide the AP information relating to beacons or other signals from other APs that have been gathered by the station. However, there may be many types of radio measurement requests.

According to an example embodiment, a beacon report may be generated based (e.g., in response to a beacon measurement request), at least in part, on one or more measurement pilots received from one or more APs. In another embodiment, the beacon report may be generated from one or more of: a station's beacon table (e.g., a table that may be automatically generated by a station based on active scanning, passive scanning, measurement pilots, etc., and does not typically involve additional measurements upon request), active scanning (use of probe requests and probe responses), passive scanning (passive monitoring beacons and probe responses from APs), and passive monitoring of measurement pilots from APs. According to an example embodiment, an AP may include a measurement mode in its beacon request to specify a specific mode of measurement (e.g., passive scanning, active scanning, measurement pilots or beacon table), or allow the station to select any of these measurement modes (e.g., except beacon table) to provide the requested information.

Another type of radio measurement report that may be requested and obtained is a neighbor report. A neighbor report may be transmitted, for example, from an AP to a wireless station to provide the station with information regarding other (e.g., neighbor) access points (APs). A neighbor report may be provided to a wireless station from an AP, for example, in an association response (e.g., in response to an association request from a station if neighbor report is requested in the association request), or may be transmitted separately from the AP to the wireless station upon request from the station. According to an example embodiment, a neighbor report may also be requested in a probe request and provided by the AP to the station in the corresponding probe response.

According to an example embodiment, a more efficient or more practical measurement of AP signals may, at least in some cases, be provided by providing a neighbor report that includes, for example, one or more of the following for one or more neighbor APs: an indication of whether a beacon or measurement pilot is received from the AP, a beacon interval, a measurement pilot interval, a TSF offset or timer value, a channel, and a BSSID (e.g., network ID). This information which may be provided in a neighbor report may be used by a wireless station to determine and perform an appropriate measurement technique to measure AP signals for one or more other APs.

For example, if a neighbor report indicates that a node (e.g., an AP) transmits measurement pilots at frequent intervals (e.g., 10 ms), the mobile station may make a determination to measure signals from that node (e.g., AP) by (passively) monitoring the node's measurement pilots. Conversely, if the neighbor report indicates that a node transmits a measurement pilot very infrequently or not at all, then the mobile station may elect to use another measurement technique to measure signals from that node or AP (e.g., active scanning). These are simply some illustrative examples and the discussion herein is not limited thereto.

In another example embodiment, a receiving node may receive a message from a first wireless node including measurement pilot transmission information for the first wireless node. The measurement pilot transmission information may be received via a probe response message or via a neighbor report, as examples. The measurement pilot transmission information may indicate, for example a measurement pilot interval for the first wireless node. The receiving node may then determine or estimate a time to receive measurement pilots from the first wireless node based on the measurement pilot transmission information.

FIG. 3 is a diagram illustrating an example neighbor report request frame body format 300 according to an example embodiment. The neighbor report request frame body 300 may include a number of fields, such as: category—which may be set to a value indicating radio measurement category; action—may be set to the value indicating neighbor report request; dialog token may be set to a non-zero value chosen by the station sending the neighbor report request to identify the neighbor report/request transaction (e.g., if the neighbor report is requested separately by a station); in an example embodiment, if the neighbor report is requested in an association request or probe request, then the dialog token may be set to zero; SSID (service set identifier)—SSID field may be variable length. One or more SSIDs (or other network IDs) may be included to request a neighbor report for specific ESSs (or specific networks); an absence of a SSID value may indicate that a neighbor report is being requested for the current ESS (extended service set).

As shown in FIG. 3, the example neighbor report request frame body 300 may also include another field: neighbor report request types—which may be used to specify whether beacon information and/or measurement pilot transmission information may be provided in the neighbor report. The neighbor report request type field may, for example, be one octet in length, and may contain several subfields, such as: 1) a beacon request bit—which may be set to 1 to request beacon information in the neighbor report, such as the beacon interval for each neighbor AP (e.g., and if this bit is clear or zero, then no beacon interval information is being requested in the neighbor report); and 2) a measurement pilot request bit—which may be set to 1 if measurement pilot transmission information (such as measurement pilot interval) is being requested in the neighbor report (e.g., and if this bit is cleared, then no measurement pilot transmission information is being requested). If both or either of these bits is set, then this may also be a request for the TSF offset for each neighbor as well, according to an example embodiment (where TSF offset may be a value of a timing synchronization function (TSF) (or other timer value) of a measurement pilot's source or a beacon's source that is being reported).

FIG. 4 is a diagram illustrating an example neighbor report response frame body format 400 according to an example embodiment, and may include a number of fields: the category and dialog token fields may be the same as the neighbor report request (FIG. 3). Action field—may be set to the value indicating neighbor report; neighbor report element—may provide information for the neighbor APs that are being reported (thus, may be of variable length).

Figure 5:
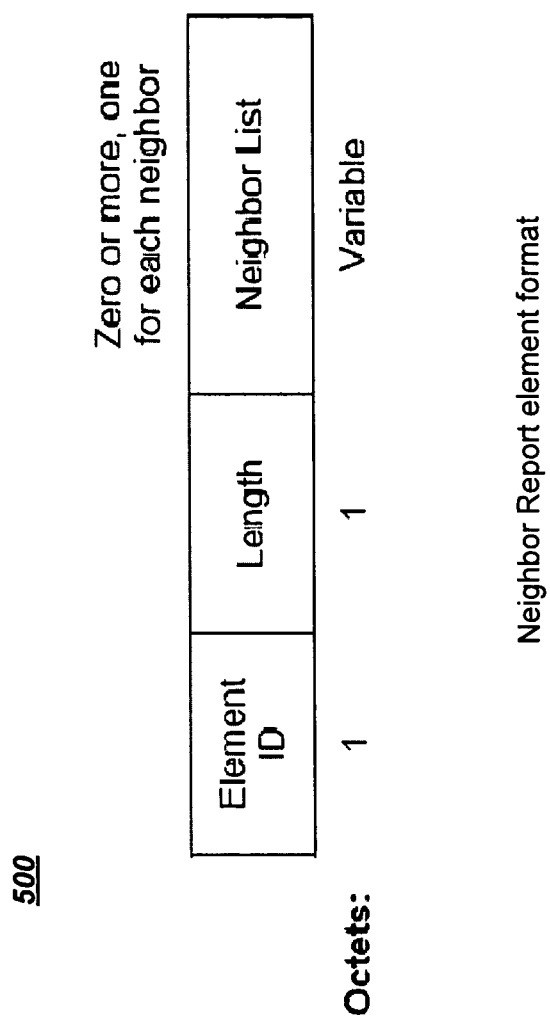
FIG. 5 is a diagram illustrating a neighbor report element format according to an example embodiment.

FIG. 5 is a diagram illustrating an example neighbor report element format 500 according to an example embodiment, which includes a number of fields: Element ID—may be set to the neighbor report value (e.g., a value to identify the neighbor report); Length—may indicate the length of the neighbor report, and may be dependent upon the number of neighboring APs being reported in the neighbor report; and Neighbor list field—may include a neighbor list field (or entry) for each AP being reported in the neighbor report.

Figure 6:
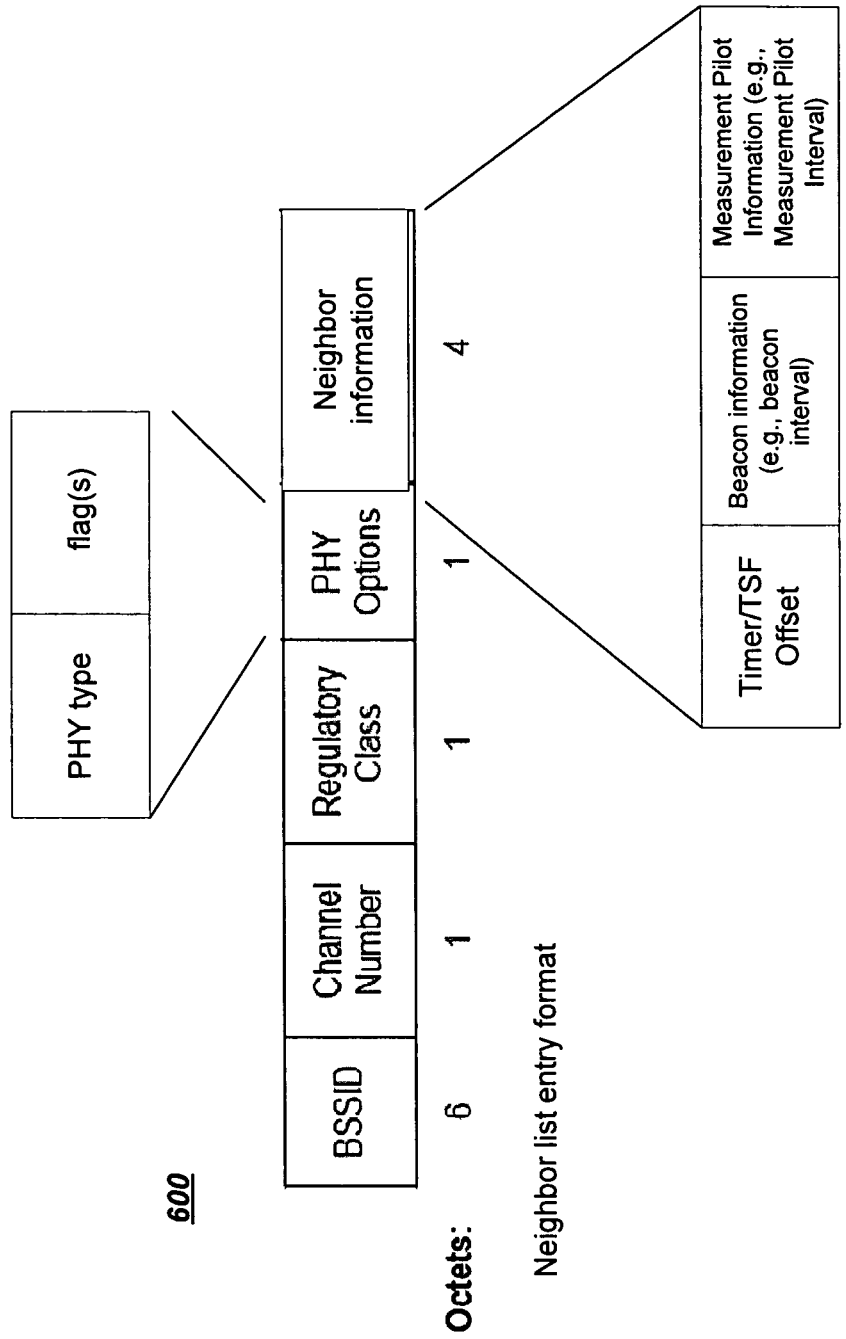
FIG. 6 is a diagram illustrating an example of neighbor list entry format according to an example embodiment.

FIG. 6 is a diagram illustrating an example neighbor list entry format 600 according to an example embodiment. As noted above, there may be a neighbor list entry for each neighbor AP being reported in the neighbor report. The neighbor list entry may include a number of fields: BSSID—may include the BSSID (or network ID) of the BSS (or network) being reported (e.g., one AP per BSS); channel number may indicate the current operating channel of the AP being reported; regulatory class—may indicate the frequency band, e.g., in which the current channel is valid; PHY options—may indicate a type of PHY, and may include one or more flags. The flags may include a TSF (timing synchronization function or timer) flag indicating a presence of a TSF offset field (or timer) value, a measurement pilot flag (or bit) indicating presence of measurement pilot transmission information, and a beacon flag indicating presence of beacon information. In an example embodiment, one or more of these flags may not be present. It is also possible to have only one flag indicating that the report includes a Neighbor information field, which may contain, e.g., TSF offset, beacon information, and information of the measurement pilot, e.g., measurement pilot interval. In an example embodiment, the flags may be omitted, and the measurement pilot interval may be included.

Also, as shown in FIG. 6, each neighbor list entry may include a neighbor information field, which may include (for each neighbor or AP): 1) a TSF offset or timer value from the AP; 2) beacon information, which may provide the beacon interval for the AP (e.g., the spacing or time interval between beacons, which may be, for example, 100 ms for some APs); and 3) measurement pilot transmission information, which may include the measurement pilot interval for the AP (e.g., the spacing or time interval between measurement pilots for the AP, which may be, for example, 10 ms for some APs), or only short (e.g. 1-bit or 2-bits) field indicating whether the neighbor AP is transmitting measurement pilot frames or whether the neighbor AP is not transmitting pilot frames or it is not known. In an example embodiment, a measurement pilot interval value set to zero may indicate that the AP is not transmitting pilots or that the interval is not known (e.g., pilots from the AP have not been detected). For example, the neighbor information field may include, for example, 6 bytes, with 2 bytes for each sub-field (TSF offset, beacon information and measurement pilot transmission information). The beacon information (e.g., beacon interval) and/or measurement pilot transmission information (e.g., measurement pilot interval) may be provided by an AP in its neighbor report if this information is requested in the neighbor report request types field in the neighbor report request 300 (FIG. 3), according to an example embodiment.

According to an example embodiment, an AP's TSF offset (or timer value) and beacon interval may allow, in some cases, a station receiving the neighbor report with such information to determine or estimate when the AP is transmitting its beacon; likewise, the AP's TSF offset (or timer value) and the AP's measurement pilot interval may allow, in some cases, a station receiving the neighbor report with such information to determine or estimate when the AP is transmitting its measurement pilot. The beacon interval and measurement pilot interval may indicate to the station how long it may need to monitor or receive signals from the AP to likely receive the AP's beacon and/or measurement pilot, according to an example embodiment.

In addition, or in the alternative, the example measurement pilot transmission information may be (or may include) a bit or flag indicating whether or not the AP is transmitting a measurement pilot (e.g., indicating whether or not a measurement pilot for the AP was detected), and the example beacon information may simply include a bit or flag indicating whether or not the AP is transmitting a beacon (e.g., indicating whether or not a beacon was detected for the AP). According to an example embodiment, if the beacon information and measurement pilot transmission information provide flags or fields indicating whether or not the AP is transmitting the beacon and measurement pilot, respectively, these flags or bits may, in some cases, be automatically provided in the neighbor report regardless of neighbor report request types requested in FIG. 3 (e.g., regardless of whether beacon information or measurement pilot transmission information was specifically requested in the neighbor report request).

Figure 7:
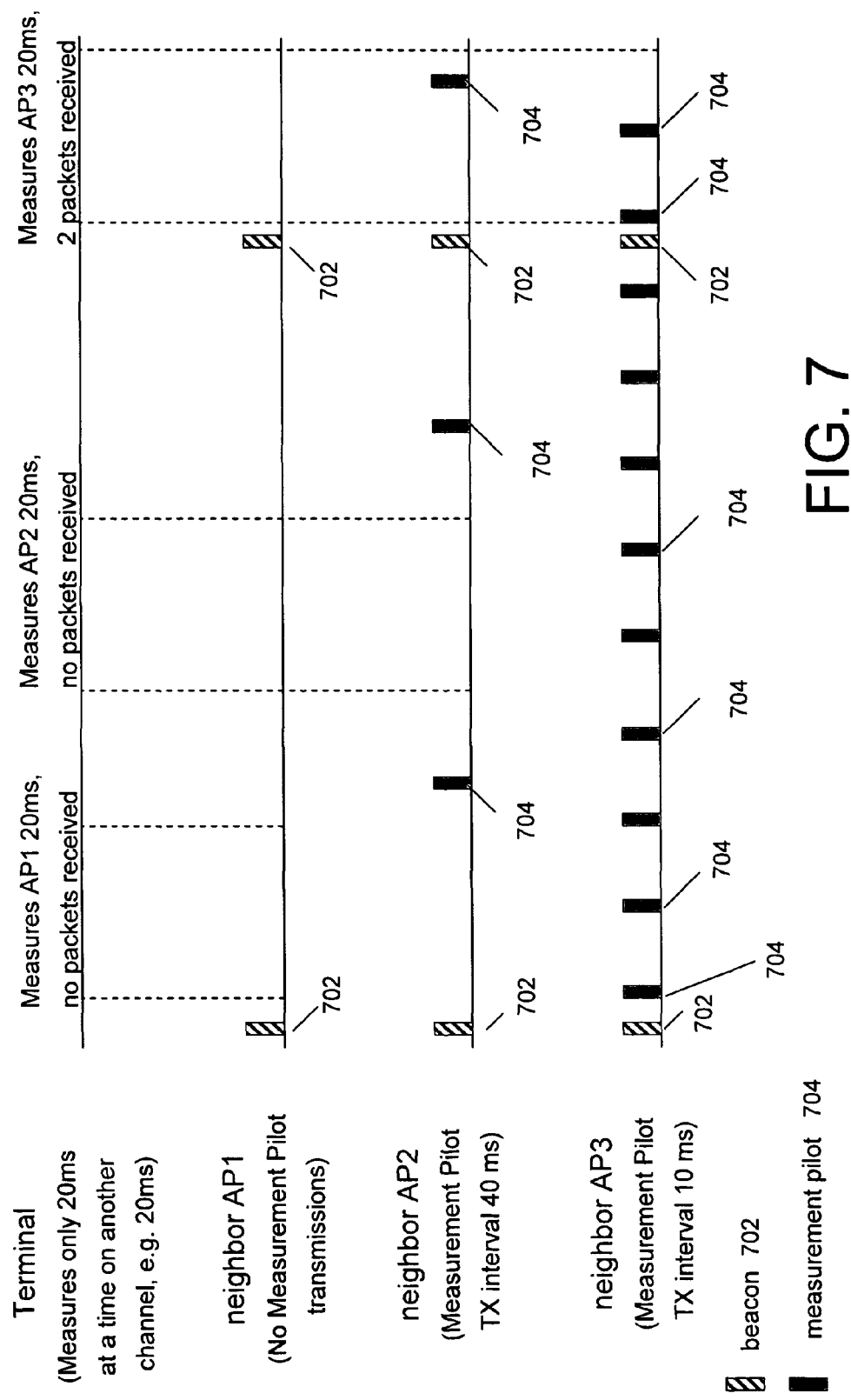
FIG. 7 is a diagram illustrating an example where a mobile station may be measuring signals from other neighbor APs without having a neighbor report providing measurement pilot transmission information.

FIG. 7 is a diagram illustrating an example wherein a mobile station may be currently associated with one AP and may be seeking to roam to another AP. Before the mobile station may roam (and associate) to any other AP, the mobile station may typically measure the signal quality of other (e.g., neighboring) APs. In this example, the mobile station may be busy handling other tasks (e.g., processing and/or forwarding voice over IP traffic or other tasks), and therefore, may have very limited time (e.g., 20 ms per channel) to monitor or scan for signals from other (neighboring) APs. In this example, the mobile station may not know which, if any, of the neighboring APs transmit measurement pilots 704, nor the transmission interval for any such measurement pilot frames. The mobile station also may or may not know the transmission interval for beacons 702 from the neighboring APs, but a beacon interval (e.g., 100 ms) is typically much larger than the typical measurement pilot interval (e.g., 10 ms).

As shown in FIG. 7, the mobile station may successively measure or sense each AP's channel for 20 ms measuring period. AP1 is measured for 20 ms, but no packets (beacon or measurement pilot signals or other packets) are received during this measuring period. Likewise, the channel for AP2 is measured or sensed for 20 ms, but no packets are detected during this measuring period. In this example, the mobile station may not have been aware that AP1 was not transmitting a measurement pilot, and that AP2 was transmitting a measurement pilot at a transmission interval of 40 ms. Therefore, in this case, the 20 ms measurement or signal sensing for AP1 and AP2 was not sufficient in this example to detect signals from AP1 and AP2, since the mobile station did not know when to measure these channels to detect beacons or measurement pilots or for how long such signal measurements would have typically been required (e.g., on average) to receive a measurement pilot frame, etc. Therefore, in this case, these two 20 ms measuring periods for AP1 and AP2 may be considered an inefficient use of resources (e.g., may have wasted valuable time and power), and may have resulted, at least in part, from a lack of information regarding the APs and their signals. In FIG. 7, the mobile station measured the channel for AP3 for 20 ms and detected two measurement pilots for AP3, although the mobile station was not initially aware that AP3 was transmitting a measurement pilot.

Figure 8:
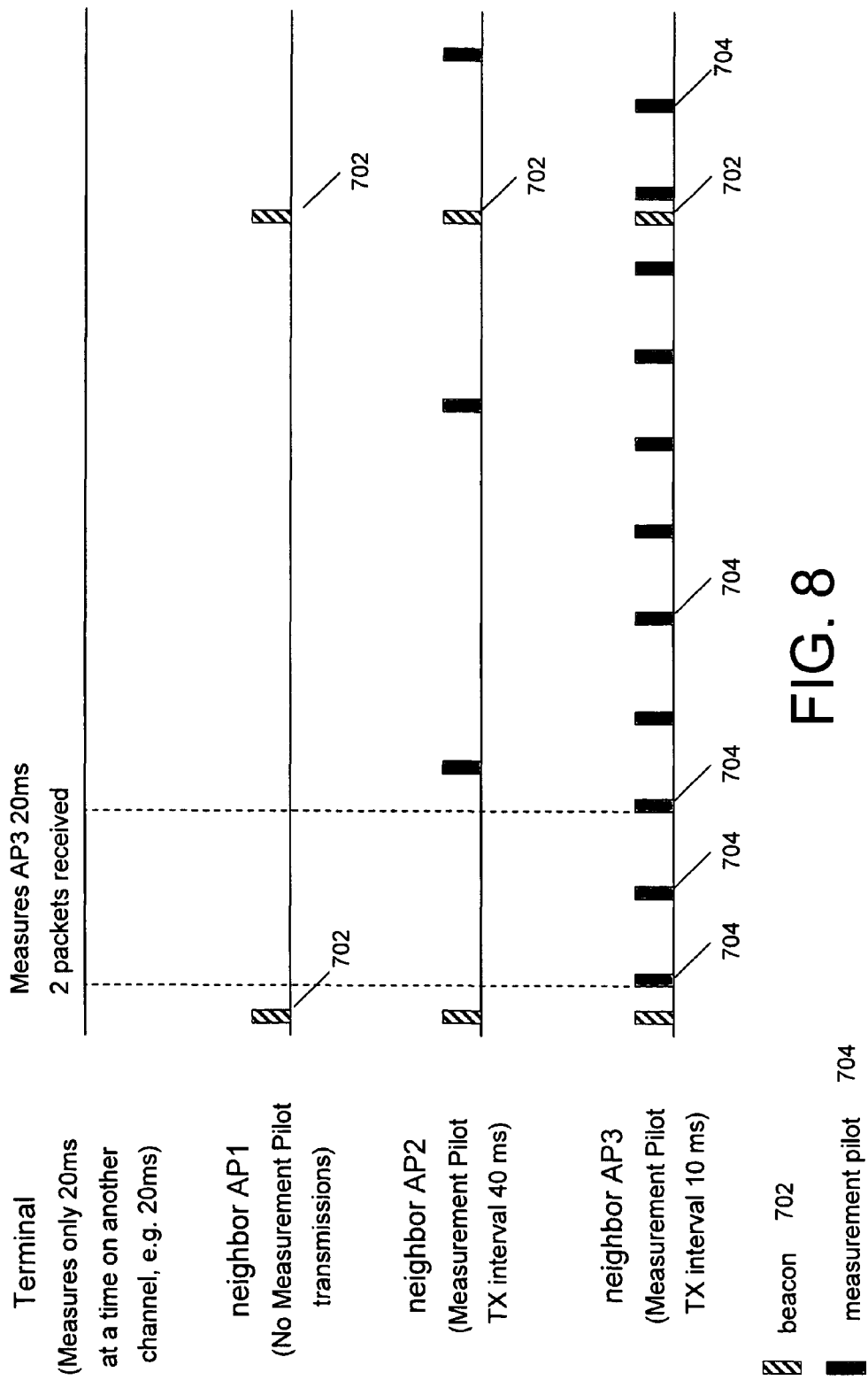
FIG. 8 is a diagram illustrating an example where a mobile station may be measuring signals from other neighbor APs, and may have received a an example neighbor report that may provide measurement pilot transmission information according to an example embodiment.

FIG. 8 is a diagram illustrating an example wherein a mobile station may be currently associated with an AP (a serving AP) and may be seeking to roam to another AP. The mobile station, in this example embodiment, may receive information in a neighbor report regarding the measurement pilots and/or beacons transmitted by one or more other (neighboring) APs. According to an example embodiment, the mobile station, either within an association request or in a separate request to its serving (currently associated) AP, for example, may transmit a neighbor report request indicating that beacon information and measurement pilot transmission information should be provided in the requested neighbor report. In response to the neighbor report request, the serving AP may then transmit to the mobile station a neighbor report that includes, for example, a BSSID and channel, a timer or TSF offset, beacon information (e.g., beacon interval) and measurement pilot transmission information (e.g., measurement pilot interval) for each of a plurality of neighboring APs, including for AP1, AP2 and AP3.

Therefore, in this manner, through the neighbor report, a mobile station may receive AP information that indicates, for example, which APs are transmitting measurement pilots, the measurement pilot interval for each AP (for those measurement pilots that are detected), the beacon interval for each AP (for those beacons detected), a timer value or TSF offset for each AP, and the BSSID and channel of each AP, and other information. The TSF or timer value from the AP may, in some cases, allow the station to estimate when the measurement pilot and/or beacon may be transmitted by the neighbor AP, which may allow the station to determine when to receive signals on a channel or from an AP.

The beacon information and particularly the measurement pilot transmission information for neighbor APs, which may be provided to a station in a neighbor report, may be very useful information to a mobile station that may be roaming or searching for another AP. This information in the neighbor report, for example, may allow the station to be more intelligent in its signal scanning or monitoring, e.g., by using this AP information to select a better or more efficient technique to measure or monitor signals from other (neighboring) APs. For example, for neighbor APs that are transmitting measurement pilots fairly frequently (e.g., every 10 ms), then the mobile station may be able to measure the AP's signals by measuring or monitoring the AP's channel only around 10-20 ms or so. On the other hand, if an AP is not transmitting a measurement pilot, or transmits a measurement pilot very infrequently, passive monitoring of beacons or measurement pilots may be an impractical or more time consuming technique to measure the AP's signals. Therefore, in an example embodiment, in such case (where there may be no or very infrequent measurement pilots from an AP, as indicated in a neighbor report), the mobile station may instead decide to use active scanning by sending probe requests to such AP to measure the AP's signals, or may elect to passively monitor or passively scan that AP during a brief period of time when it may be estimated that the AP's measurement pilot or beacon will be transmitted.

The neighbor report may facilitate efficient scanning, since mobile stations may now be able to target active scanning or other signal measurement techniques for specific APs. The neighbor report provides the mobile station with information (e.g., channel ID, BSSID, TSF offset or timer value, and measurement pilot interval for one or more neighbor APs) that may be useful (e.g., for some fields) to perform active scanning on those APs.

Referring to FIG. 8, the mobile station may receive a neighbor report providing information regarding a plurality of APs, including AP1, AP2 and AP3 (although specific times of transmission for beacons/measurement pilots may not be necessarily provided or available to the station). The neighbor report in this example may indicate: 1) that AP1 transmits a beacon every 100 ms (i.e., a beacon interval of 100 ms), but no measurement pilots were transmitted; 2) that AP2 transmits a measurement pilot every 40 ms (i.e., measurement pilot interval of 40 ms) and transmits a beacon every 100 ms; and 3) that AP3 may transmit a beacon every 100 ms and a measurement pilot approximately every 10 ms. This is merely an example used for illustrative purposes only.

Therefore, in the example of FIG. 8, the mobile station may monitor only for 20 ms per channel, and may not know exactly when beacons 702 or measurement pilots 704 are transmitted, but does know that AP3 sends frequent (e.g., every 10 ms) measurement pilots, and that AP1 and AP2 send no measurement pilots and infrequent measurement pilots, respectively. Therefore, the mobile station may use a 20 ms measurement period to measure signals on the channel for AP3 (to measure signals for AP3) since probably two pilots may be received in this 20 ms measurement period (due to the measurement pilot interval of 10 ms). On the other hand, the mobile station may know (e.g., from the neighbor report) that 20 ms may not be a sufficient measurement period to measure signals from each of AP1 and AP2, and therefore, may elect to perform active scanning or other techniques (e.g., rather than passively scanning or monitoring measurement pilots) to measure signals for these APs. In another example embodiment, the station may obtain a rough estimate of beacon transmission times from beacon interval, and TSF offset. In such case, the station may elect any technique, including passive scanning, since the station may be able to target when it does the passive scanning based on the estimated beacon transmission times, etc. This is merely another example embodiment, and the disclosure is not limited thereto.

Therefore, a more efficient or more practical measurement of AP signals may, at least in some cases, be facilitated by providing a neighbor report that includes, for example, one or more of the following for one or more neighbor APs: an indication of whether a beacon or measurement pilot is received from the AP, a beacon interval, a measurement pilot interval, a TSF offset or timer value, a channel, and a BSSID (or network ID).

As noted above, a wireless node may receive a neighbor report from a first wireless node, such as an AP. The neighbor report may be obtained by a station from an AP, for example, in an association response, a probe response, or in response to a separate neighbor report request. In an example embodiment, the neighbor report may include measurement pilot transmission information for one or more other nodes in the network, such as an indication whether the other node is transmitting a measurement pilot or a measurement pilot interval for the other node, for example.

According to another example embodiment, a wireless node (or station) may receive a message from a first wireless node, such as an AP. The message may include measurement pilot information (also known as measurement pilot transmission information) for the first wireless node. The message may be a probe response message, an association response message, a neighbor report message, as examples, or other messages. The measurement pilot transmission information may include, for example, a measurement pilot interval for the first wireless node, identifying a time period between measurement pilots from the first wireless node, and may also indicate a timer or TSF offset. The receiving node may seek to receive further signals from the first wireless node to allow the receiving node to measure signal strength, etc. of signals from the first wireless node. By receiving measurement pilot transmission information, e.g., indicating a measurement pilot interval for the first wireless node, the receiving node may, for example, adjust its times to scan or receive measurement pilots from the first wireless node that may better match or align with actual measurement pilot transmission times from the first wireless node (e.g., after receiving a pilot frame).

The measurement pilot transmission information may, for example, allow the node to determine a signal measurement technique to measure signals from the first wireless node. For example, if the probe response message may include measurement pilot transmission information indicating that measurement pilots are transmitted from the first wireless node every 10 ms, the node may elect to receive the next measurement pilot. On the other hand, if the measurement pilot transmission information from the first wireless node indicates that the first wireless node transmits measurement pilots only every 50 ms, or maybe not at all, the node may elect a more active scanning technique, such as sending further probe request messages to receive further probe response messages (e.g., to measure the signal strength of the AP) from the first wireless node, for example.

The measurement pilot transmission information may also allow the receiving node to determine or estimate a time to receive measurement pilots from the first wireless node. Thus, after the measurement pilot transmission information for the first wireless node has been received, e.g., via probe response, the receiving node may determine or estimate a time to receive measurement pilots from the first wireless node based on the received measurement pilot transmission information (e.g., and first received pilot frame), and may then receive measurement pilots from the first wireless node at the estimated time(s), according to an example embodiment.

Figure 9:
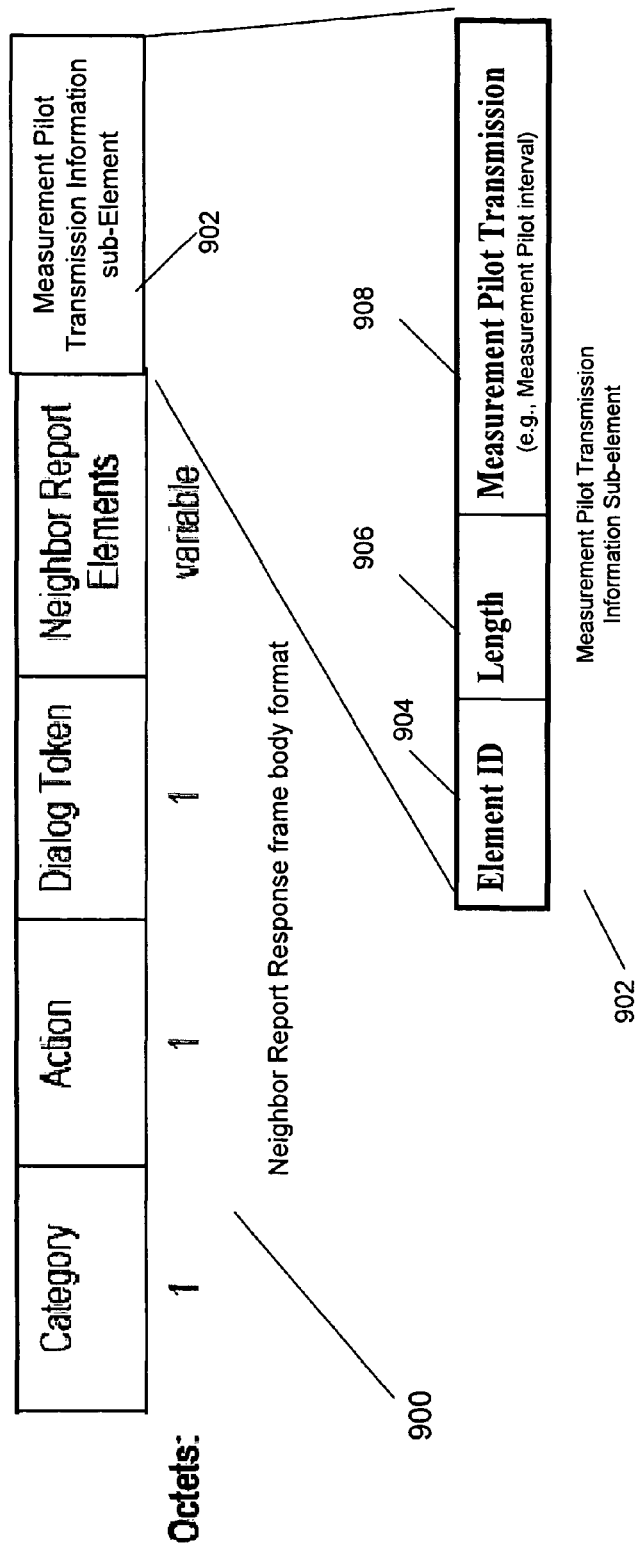
FIG. 9 is a diagram illustrating a neighbor report response frame body format according to another example embodiment.

FIG. 9 is a diagram illustrating a neighbor report request frame body format 900 according to another example embodiment. According to an example embodiment, the neighbor request frame body 900 may include a category field, an action field, a dialog token and one or more neighbor report elements as discussed previously with regard to FIG. 4.

In addition, the neighbor report response frame 900 in FIG. 9 may include a measurement pilot transmission information sub-element 902 (e.g., a sub-element to the neighbor report elements or frames), which may provide measurement pilot transmission information for the node that is transmitting the neighbor report (e.g., the first wireless node in this example), for example, or for neighbor nodes that are transmitting. Measurement pilot transmission information sub-element 902 may include an element ID 904 identifying this sub-element as measurement pilot transmission information sub-element, a length field 906, and a measurement pilot transmission field 908. Measurement pilot transmission field 908 may, for example, identify a measurement pilot interval for the transmitting node. A value of zero, or other predetermined value, may be used to indicate that the transmitting node does not transmit a measurement pilot.

Figure 10:
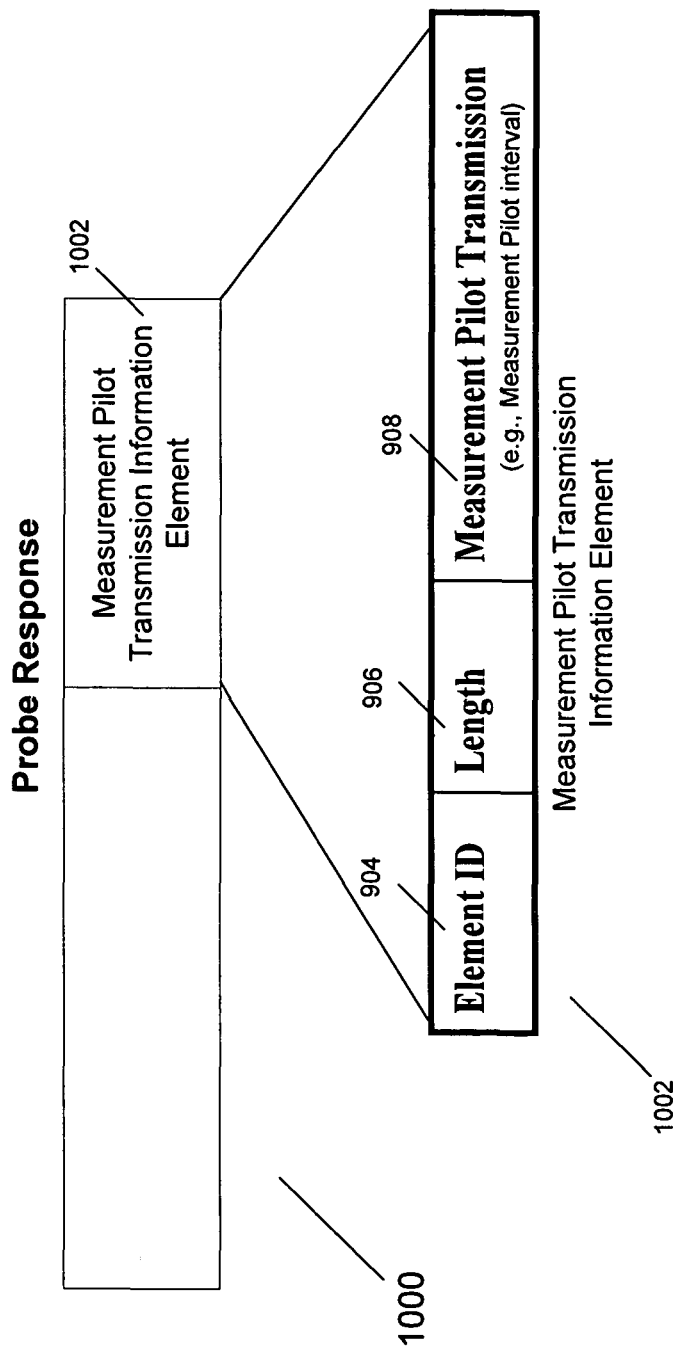
FIG. 10 is a diagram illustrating a probe response frame according to an example embodiment.

FIG. 10 is a diagram illustrating a probe response frame 1000 according to an example embodiment. Probe response frame 1000 may be transmitted in response to a probe request frame, for example. Probe response frame 1000 may include a number of fields or elements, such as a measurement pilot transmission information element (measurement pilot transmission IE) 1002. The measurement pilot transmission IE 1002, included in probe response 1000, may include an element ID field 904, a length field 906, and a measurement pilot transmission field 908, as discussed previously with regard to the measurement pilot transmission information sub-element 902 (FIG. 9).

According to an example embodiment, for probe responses, the measurement pilot interval may be set to zero if measurement pilot frames are not transmitted by the reported AP, and for neighbor reports, the measurement pilot interval may be set to zero, for example, if the reported AP is not transmitting measurement pilot frames or if the measurement pilot interval is not known by the reporting node or AP.

Figure 11:
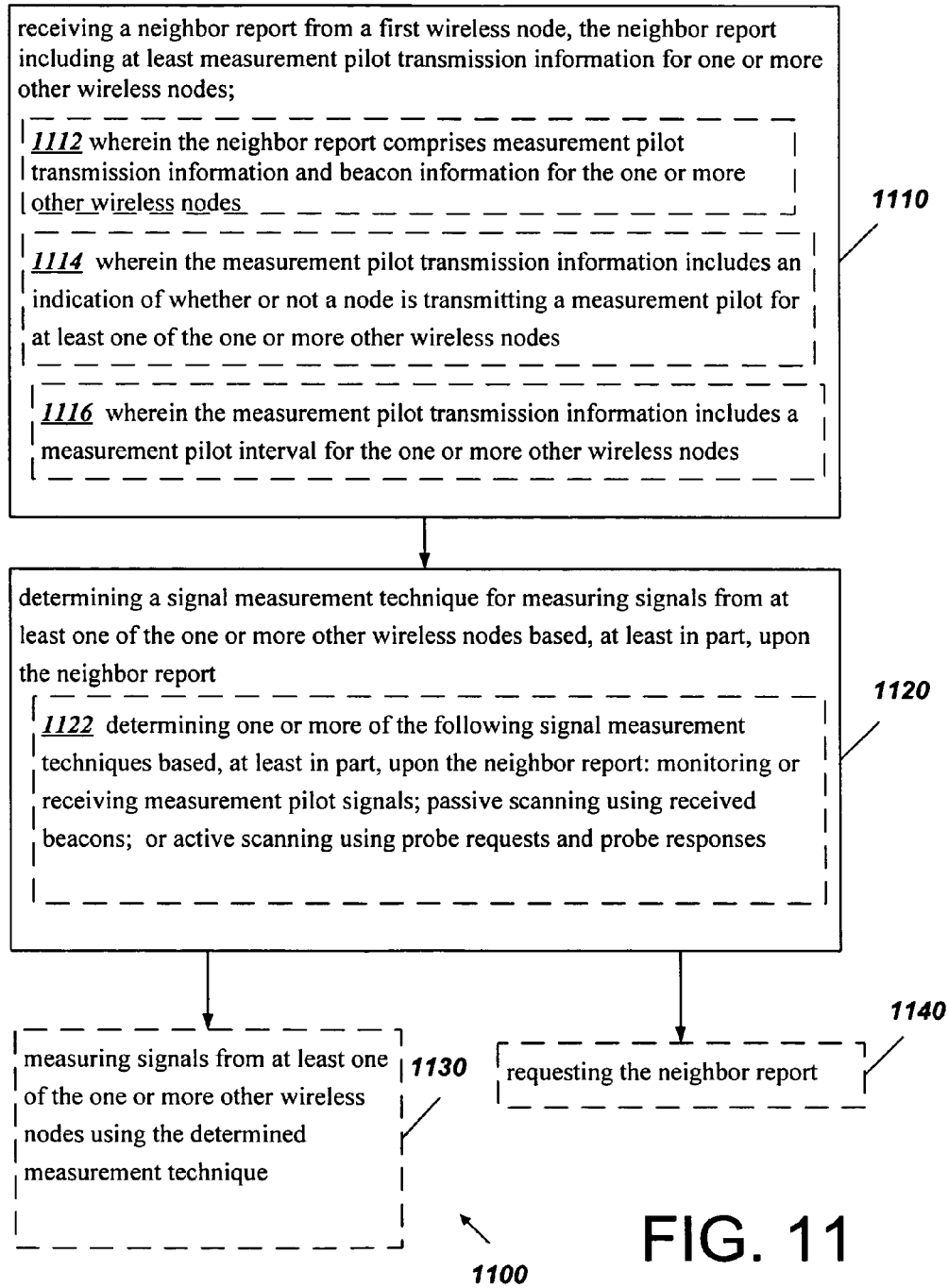
FIG. 11 is a flow chart illustrating operation of a wireless node according to an example embodiment.

FIG. 11 is a flowchart illustrating operation of a wireless node according to an example embodiment. At 1110, a neighbor report may be received from a first wireless node, the neighbor report including at least measurement pilot transmission information for one or more other wireless nodes. For example, the wireless node 106 may receive the neighbor report from the AP 104. According to an example embodiment, the neighbor report may include measurement pilot transmission information and beacon information for the one or more other wireless nodes (1112). According to another example embodiment, the measurement pilot transmission information may include an indication of whether or not a node is transmitting a measurement pilot for at least one of the one or more other wireless nodes (1114). According to another example embodiment, the measurement pilot transmission information may include a measurement pilot interval for the one or more other wireless nodes (1116). For example, the measurement pilot transmission information may include a measurement pilot transmission field 908 that may include a measurement pilot interval.

At 1120, a signal measurement technique may be determined for measuring signals from at least one of the one or more other wireless nodes based, at least in part, upon the neighbor report. According to an example embodiment, the determining may include determining one or more of the following signal measurement techniques based, at least in part, upon the neighbor report: monitoring or receiving measurement pilot signals; passive scanning using received beacons; or active scanning using probe requests and probe responses (1122).

According to an example embodiment, signals may be measured from at least one of the one or more other wireless nodes using the determined measurement technique (1130). According to another example embodiment, the neighbor report may be requested (1140).

Figure 12:
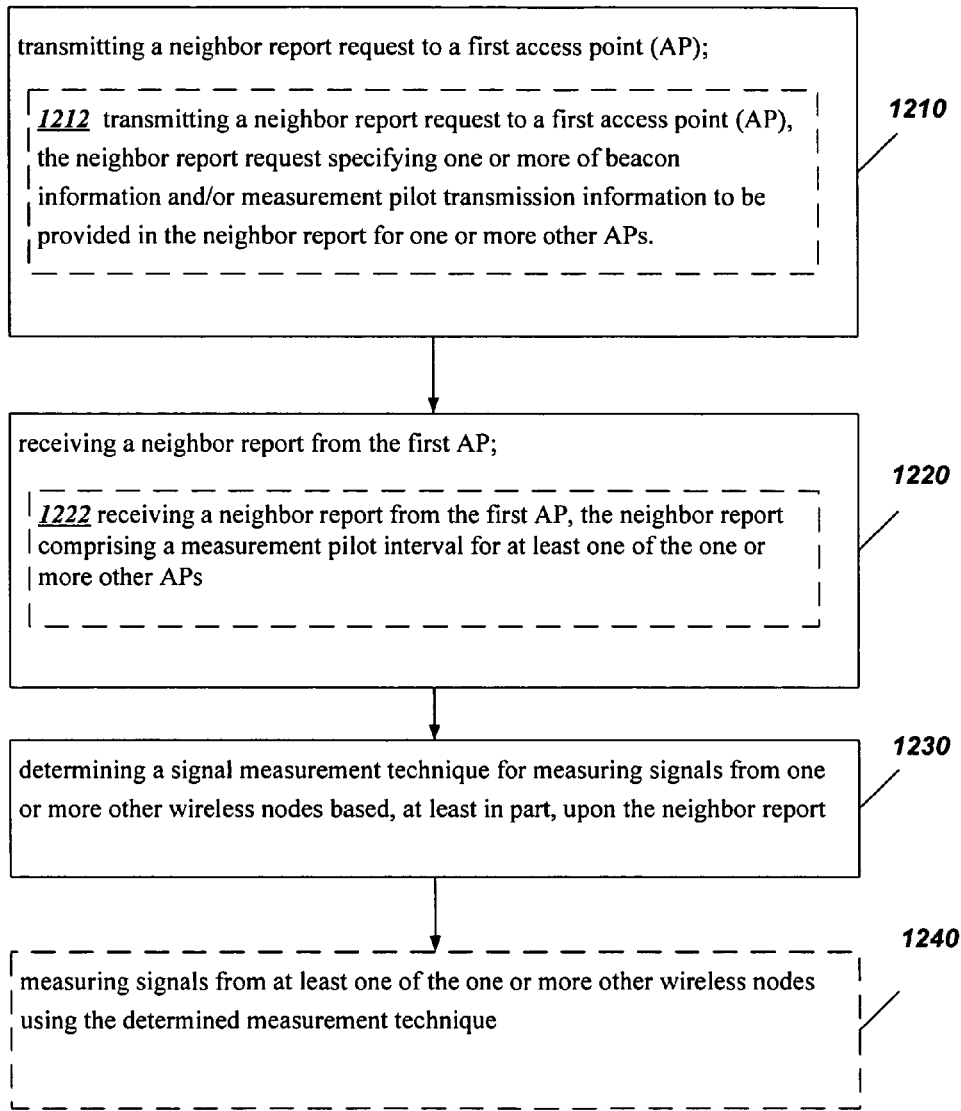
FIG. 12 is a flow chart illustrating operation of a wireless node according to an example embodiment.

FIG. 12 is a flow chart illustrating operation of a wireless node according to an example embodiment. At 1210, a neighbor report request may be transmitted to a first access point (AP). For example, a neighbor report request 300 may be transmitted to the AP 104. According to an example embodiment, the transmitting a neighbor report request may include transmitting a neighbor report request to a first access point (AP), the neighbor report request specifying one or more of beacon information and/or measurement pilot transmission information to be provided in the neighbor report for one or more other APs (1212).

At 1220, a neighbor report may be received from the first AP. For example, the wireless node 106 may receive a neighbor report 400 from the AP 104. According to an example embodiment, the neighbor report may be received from the first AP, the neighbor report comprising a measurement pilot interval for at least one of the one or more other APs (1222). For example, the neighbor report 400 may include a measurement pilot interval as discussed previously with regard to FIG. 6.

At 1230, a signal measurement technique may be determined for measuring signals from one or more other wireless nodes based, at least in part, upon the neighbor report. According to an example embodiment, signals may be measured from at least one of the one or more other wireless nodes using the determined measurement technique (1240).

Figure 13:
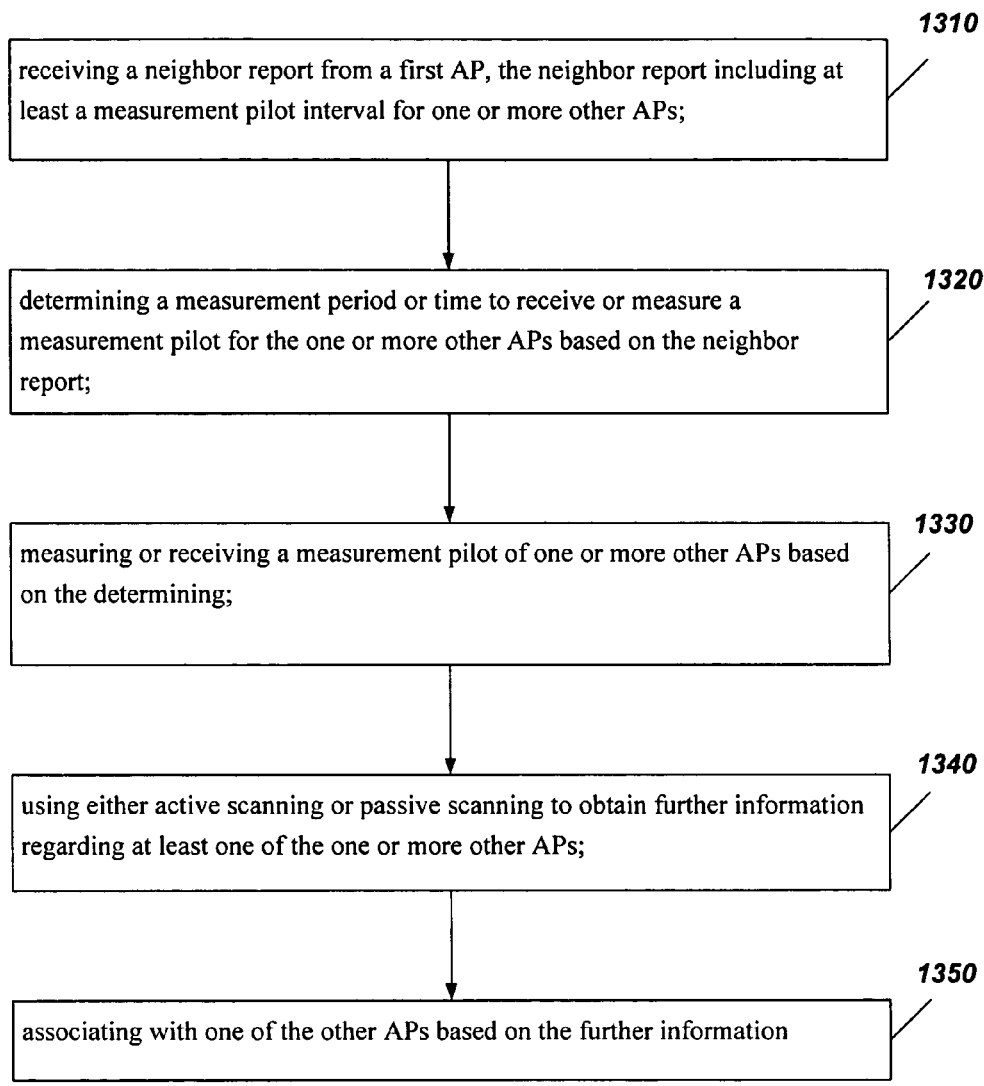
FIG. 13 is a flow chart illustrating operation of a wireless node according to another example embodiment.

FIG. 13 is a flow chart illustrating operation of a wireless node according to another example embodiment. At 1310, a neighbor report may be received from a first AP, the neighbor report including at least a measurement pilot interval for one or more other APs. For example, the wireless node 106 may receive a neighbor report 400 including the measurement pilot interval as shown in FIG. 6 from the AP 104. At 1320, a measurement period or time to receive or measure a measurement pilot for the one or more other APs may be determined based on the neighbor report. At 1330, a measurement pilot of one or more other APs may be measured or received based on the determining. At 1340, either active scanning or passive scanning may be used to obtain further information regarding at least one of the one or more other APs. At 1350, one of the other APs may be associated with based on the further information.

Figure 14:
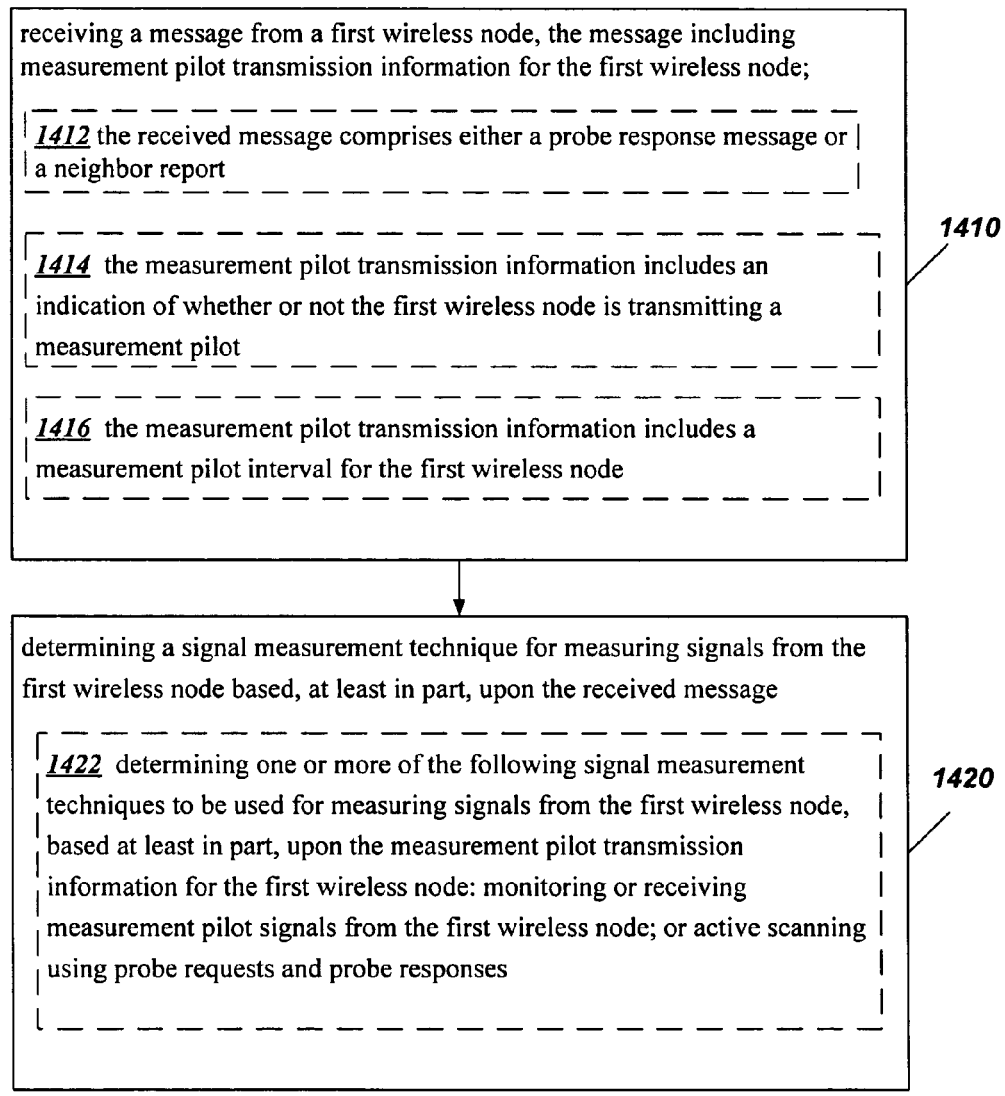
FIG. 14 is a flow chart illustrating operation of a wireless node according to another example embodiment.

FIG. 14 is a flow chart illustrating operation of a wireless node according to another example embodiment. At 1410, a message may be received from a first wireless node, the message including measurement pilot transmission information for the first wireless node. For example, the wireless node 106 may receive a neighbor report 400 including the measurement pilot transmission information of FIG. 6 from the AP 104. According to an example embodiment, the received message may include either a probe response message or a neighbor report (1412). According to another example embodiment, the measurement pilot transmission information may include an indication of whether or not the first wireless node is transmitting a measurement pilot (1414). According to yet another example embodiment, the measurement pilot transmission information may include a measurement pilot interval for the first wireless node (1416).

At 1420, a signal measurement technique for measuring signals from the first wireless node may be determined based, at least in part, upon the received message. According to an example embodiment, the determining may include one or more of the following signal measurement techniques to be used for measuring signals from the first wireless node, based at least in part, upon the measurement pilot transmission information for the first wireless node: monitoring or receiving measurement pilot signals from the first wireless node; or active scanning using probe requests and probe responses (1422).

Figure 15:
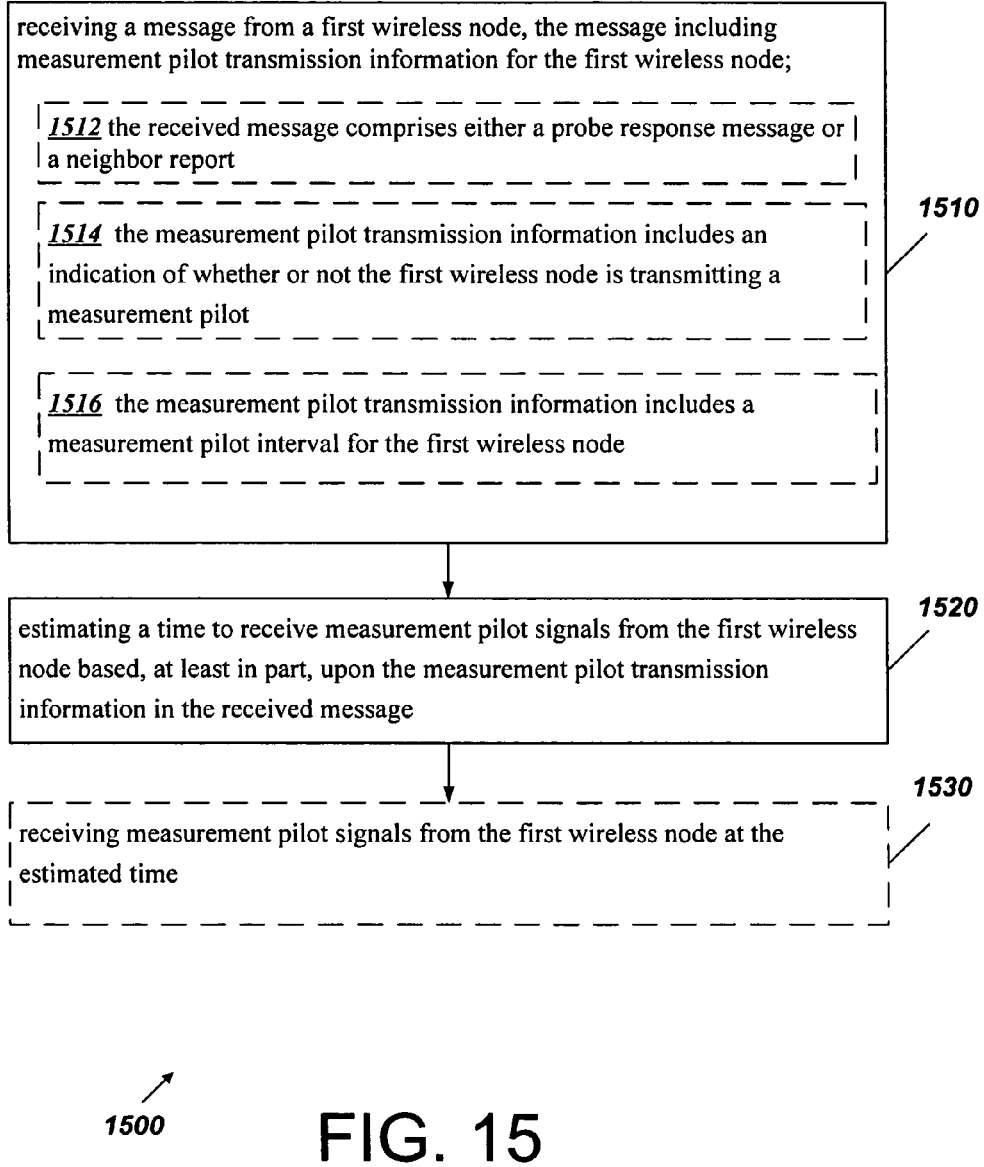
FIG. 15 is a flow chart illustrating operation of a wireless node according to another example embodiment.

FIG. 15 is a flow chart illustrating operation of a wireless node according to another example embodiment. At 1510, a message may be received from a first wireless node, the message including measurement pilot transmission information for the first wireless node. For example, the wireless node 106 may receive a neighbor report response 900 including the measurement pilot transmission information of FIG. 9 or 10 from the AP 104. According to an example embodiment, the received message may include either a probe response message or a neighbor report (1512). For example, the received message may include the neighbor report response 900 or the probe response 1000. According to an example embodiment, the measurement pilot transmission information may include an indication of whether or not the first wireless node is transmitting a measurement pilot (1514). According to an example embodiment, the measurement pilot transmission information may include a measurement pilot interval for the first wireless node (1516).

At 1520, a time to receive measurement pilot signals from the first wireless node may be estimated based, at least in part, upon the measurement pilot transmission information in the received message. According to an example embodiment, measurement pilot signals may be received from the first wireless node at the estimated time (1530).

FIG. 16 is a flow chart illustrating operation of a wireless node according to another example embodiment. At 1610, a neighbor report may be received from a first wireless node, the neighbor report including at least measurement pilot transmission information for one or more other wireless nodes. For example, the wireless node 106 may receive the neighbor report from the AP 104. According to an example embodiment, the measurement pilot transmission information may include a measurement pilot interval for the one or more other wireless nodes (1612). For example, the measurement pilot transmission information may include a measurement pilot transmission field 908 that may include a measurement pilot interval.

Figure 17:
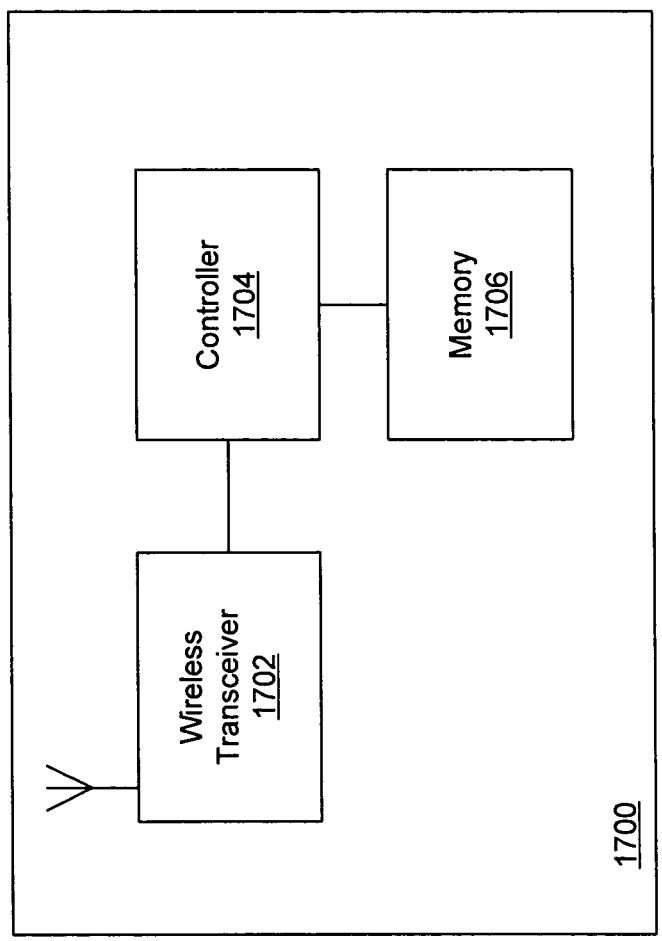
FIG. 17 is a block diagram illustrating an apparatus that may be provided in a wireless node according to an example embodiment.

As shown in FIG. 17, each node (e.g., mobile station or AP) may comprise an apparatus 1700 according to an example embodiment. The apparatus 1700 may include, for example, a wireless transceiver 1702 to transmit and receive signals, a processor or controller 1704 to control operation of the node and execute instructions or software, and a memory 1006 to store data and/or instructions. Each node may be programmed or adapted to perform the various functions or tasks described above. The wireless node controller 1704 may by programmable, and capable of executing software or other instructions stored in memory or on other computer media to perform the various tasks and functions described above. In addition, a storage medium may be provided that includes stored instructions, when executed by a processor (such as a node or the node's processor 1704) will result in the processor performing one or more of the functions or tasks or services described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or computer readable medium or in a propagated signal, for execution by, or to control the operation of, a data processing apparatus, e.g., a programmable processor or multiple processors, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the embodiments have been illustrated as described herein, many modifications, substitutions, changes and equivalents will now occur to those skilled in the art. It is therefore, to be understood that the appended claims are intended to cover all such modifications and changes as fall within the true spirit of the various embodiments.

What is claimed is:

1. A method comprising:
  receiving a neighbor report from a first wireless node, the neighbor report including:
    respective measurement pilot transmission information for one or more other wireless nodes;
    respective beacon information for the one or more other wireless nodes;
    an indication of whether or not a node is transmitting a measurement pilot; and
    in the event a node is transmitting a measurement pilot, a measurement pilot interval, for at least one of the one or more other wireless nodes; and
  selecting a signal measurement technique for measuring signals from at least one of the one or more other wireless nodes based, at least in part, upon the neighbor report.

2. The method of claim 1 wherein the measurement pilot transmission information includes an indication of whether each node of the one or more wireless nodes is transmitting a respective measurement pilot.

3. The method of claim 1 wherein the measurement pilot transmission information includes a measurement pilot interval for the one or more other wireless nodes.

4. The method of claim 1 wherein the neighbor report comprises a measurement pilot interval, a network ID and a timer value or timer offset for the one or more other wireless nodes.

5. The method of claim 1 and further comprising measuring signals from at least one of the one or more other wireless nodes using the selected measurement technique.

6. The method of claim 1 wherein the determining comprises selecting one or more of the following signal measurement techniques based, at least in part, upon the neighbor report:
  monitoring or receiving measurement pilot signals;
  passive scanning using received beacons; or
  active scanning using probe requests and probe responses.

7. The method of claim 1 and further comprising requesting the neighbor report.

8. The method of claim 1 wherein the selecting comprises selecting to monitor or receive measurement pilot signals for a period of time based, at least in part, upon a measurement pilot interval for at least one of the one or more other wireless nodes.

9. A method comprising:
  transmitting a neighbor report request to a first access point (AP);
  receiving a neighbor report from the first AP; and selecting a signal measurement technique for measuring signals from one or more other wireless nodes based, at least in part, upon the neighbor report,
wherein the neighbor report includes:
respective measurement pilot transmission information for the one or more other wireless nodes;
respective beacon information for the one or more other wireless nodes;
an indication of whether or not a node is transmitting a measurement pilot; and
in the event a node is transmitting a measurement pilot, a measurement pilot interval, for at least one of the one or more other wireless nodes.

10. The method of claim 9 wherein the transmitting the neighbor report request comprises transmitting the neighbor report request to a first AP, the neighbor report request specifying beacon information and measurement pilot transmission information to be provided in the neighbor report for one or more other APs.

11. The method of claim 9 and further comprising measuring signals from at least one of the one or more other wireless nodes using the selected measurement technique.

12. The method of claim 9 wherein the receiving the neighbor report comprises receiving the neighbor report from the first AP, the neighbor report comprising a measurement pilot interval for at least one of the one or more other APs.

13. A method comprising:
receiving a neighbor report from a first access point AP, the neighbor report including:
respective measurement pilot transmission information for one or more other-APs;
a measurement pilot interval for the one or more other APs; and
respective beacon information for the one or more other APs;
selecting a measurement period of time to receive or measure a measurement pilot for the one or more other APs based on the neighbor report;
measuring a measurement pilot of one or more other APs based on the selecting;
using either active scanning or passive scanning to obtain further information regarding at least one of the one or more other APs; and
associating with one of the one or more other APs based on the further information.

14. An apparatus comprising:
at least one processor; and
at least one memory including computer program code, the at least one memory and the computer program code being configured to, with the at least one processor, cause the apparatus at least to:
receive a neighbor report from a first wireless node, the neighbor report including at least measurement pilot transmission information for one or more other wireless node and beacon information for the one or more other wireless nodes; and
selecting a signal measurement technique for measuring signals from the one or more other wireless nodes based, at least in part, upon the neighbor report,
the neighbor report including:
an indication of whether or not a node is transmitting a measurement pilot, and
in the event a node is transmitting a measurement pilot, a measurement pilot interval, for at least one of the one or more other wireless nodes.

15. A method comprising:
receiving a neighbor report from a first wireless node, the neighbor report including at least measurement pilot transmission information and beacon information for one or more other wireless nodes, wherein the measurement transmission information includes and indication of whether or not at least one of the one or more wireless nodes is transmitting a respective measurement pilot, and in the event a node is transmitting a measurement pilot, a measurement pilot interval, for at least one of the one or more other wireless nodes.

16. The method of claim 15 wherein the measurement pilot transmission information includes a measurement pilot interval for the one or more other wireless nodes.

17. An apparatus comprising:
at least one processor; and
at least one memory including computer program code, the at least one memory and the computer program code being configured to, with the at least one processor, cause the apparatus at least to:
receive a neighbor report from a first wireless node, the neighbor report including at least measurement pilot transmission information and beacon information for one or more other wireless nodes,
wherein the measurement pilot transmission information includes an indication of whether or not at least one of the one or more other wireless nodes is transmitting a respective measurement pilot, and in the event a node is transmitting a measurement pilot, a measurement pilot interval, for at least one of the one or more other wireless nodes.

* * * * *

UNITED STATES PATENT AND TRADEMARK OFFICE
CERTIFICATE OF CORRECTION

| | | |
|---|---|---|
| PATENT NO. | : 8,897,788 B2 | Page 1 of 1 |
| APPLICATION NO. | : 11/521063 | |
| DATED | : November 25, 2014 | |
| INVENTOR(S) | : Ruuska | |

It is certified that error appears in the above-identified patent and that said Letters Patent is hereby corrected as shown below:

In the specification

Column 16,
Line 50, "determining" should read --selecting--.

In the claims

Column 17,
Line 16, "to a first" should read --to the first--.

Column 18,
Line 22, "includes and indication" should read --includes an indication--.

Signed and Sealed this
Twenty-first Day of July, 2015

Michelle K. Lee
*Director of the United States Patent and Trademark Office*